United States Patent Office 3,103,500
Patented Sept. 10, 1963

3,103,500
POLYOLEFINS HEAT STABILIZED WITH 2-ALKYL-6-MERCAPTO-P-CRESOLS
Clarence E. Tholstrup and Gerald R. Lappin, Kingsport, Tenn., assignors to Eastman Kodak Company, Rochester, N.Y., a corporation of New Jersey
No Drawing. Filed Feb. 5, 1960, Ser. No. 6,886
7 Claims. (Cl. 260—45.95)

This invention relates to paraffin wax and to highly polymeric poly-α-monoolefins such as polyethylene, polypropylene, etc. which contain as heat stabilizers against both discoloration and viscosity breakdown, 2,4-dialkylated-6-mercaptophenols. These stabilizer compounds are superior to butylated hydroxyanisole, butylated hydroxytoluene and many other phenols including phenols containing sulfur as regards their over-all combination of properties.

It is an object of this invention to provide poly-α-monoolefins having excellent heat stability such that they can be melt formed into shaped objects, coatings, sheets and the like without discoloration or loss of physical properties. Another object is to provide paraffin wax similarly improved. Other objects will be apparent elsewhere in this specification and claims.

According to a preferred embodiment of this invention there is provided a stabilized composition comprising a solid hydrocarbon selected from the group consisting of paraffin wax and a polymer of an α-mono-olefin having from 2 to 8 carbon atoms, containing as a stabilizer from 0.005 to 4% by weight of a 2,4-dialkylated-6-mercaptophenol wherein each alkyl radical in the 2-position contains from 1 to 20 carbon atoms and each alkyl radical in the 4-position contains from 1 to 4 carbon atoms.

The stabilizers which can be so employed include 2-tert. butyl-4-methyl-6-mercapto-phenol, 2-tert. octyl-4-propyl-6-mercaptophenol, 2-hexyl-4-methyl, 2-dodecyl-4-methyl-6-mercaptophenol, 2-octadecyl-4-tert. butyl-6-mercaptophenol, etc. It is preferred that the alkyl radical in the 2-position contains more carbon atoms than that in the 4-position.

The poly-α-olefins which can be stabilized are preferably polyethylene and polypropylene, both isotactic, syndiotactic, etc. It is in such substrates that the especially unobvious consequences of this invention can be achieved although the stabilizers are also of some value in protecting organic materials in general such as fats, fatty oils, essential oils, vitamins, fatty waxes, tallows, lubricants, greases, fuel oil, gasoline, rubber, polyesters, cellulose esters, alkyd resins, paints, vinyl resins, polyamides, polyurethanes, etc. However, in a great number of substrates only slight if any improved stability is obtained whereby the unobviousness of the results in accordance with the present invention is emphasized.

The stabilizers of this invention can be prepared by various means as will be apparent to those skilled in the chemical arts. The following is for illustrative purposes and applies to the homologous stabilizers also contemplated by this invention.

*Preparation of 2-tert-butyl-6-mercapto-p-cresol.*—To a solution of 32.8 g. (0.2 mole) 2-tert-butyl-p-cresol in 150 ml. of hexane was added slowly 13.5 g. (0.1 mole) of sulfur monochloride. After the evolution of hydrogen chloride had stopped the mixture was allowed to stand for two hours. The hexane was then removed by evaporation and the residue was recrystallized from 150 ml. of methanol to give 24 g. (61%) of 2,2′-dithiobis(6-tert-butyl-p-cresol), M.P. 108–109°. This disulfide was then dissolved in 200 ml. of glacial acetic acid and to the solution was added 35 g. of zinc dust. The mixture was refluxed for 3 hours and then filtered while hot. To the filtrate was added 200 ml. of 6 N HCl. The solution was then cooled to 5° and the solid product collected by filtration to give 19 g. (80%) of the desired product, M.P. 34–35°.

*Anal.*—Calcd. for $C_{11}H_{16}OS$: C, 67.3; H, 8.16; S, 16.34. Found: C, 67.4; H, 8.02; S, 15.99.

This invention can be further illustrated by the following examples of preferred embodiments although it will be understood that these examples are included merely for purposes of illustration and are not intended to limit the scope of the invention unless otherwise specifically indicated:

EXAMPLES OF POTENCY TEST DATA (1) *Potency of subject antioxidants in wax.*—The data shown in the following table shows compounds of this invention shown to be effective in paraffin wax.

| Antioxidant (0.01% by Wt.): | AOM Data (150° C.) (Hr. to 20 meq.) [1] |
|---|---|
| Control | 3 |
| BHA | 15 |
| BHT | 16 |
| 2-tert-butyl-6-mercapto-p-cresol | 259 |
| 2-dodecyl-6-mercapto-p-cresol | 237 |

[1] The stability rating is the time required for a sample of wax to build up in peroxides to a level of 20 milliequivalent per kilogram of sample. During this time the wax sample is heated to 150° C. and air bubbled through the sample at the rate of 2.33 ml./sec.

(2) *Potency of subject antioxidants in polyethylene.*—The stability test (oven storage test) used in this particular application serves as an accelerated test to measure the storage life of polyethylene at an elevated temperature. In this test, samples of stabilized polyethylene are stored in a forced air oven heated at 140° C. The oven life of the polyethylene is expressed as the number of hours of storage at 140° C. before peroxide-build-up in the sample takes place. The presence of peroxides is measured by a modified iodimetry test. The oven storage test was also conducted at 160° C. The results from tests at 140° C. and 160° C. are reported in the following table.

| Antioxident in Polyethylene | Percent | Oven Storage Data—Oven life | |
|---|---|---|---|
| | | Hr. at 140° C. | Hr. at 160° C. |
| Control | 0 | 10 | 2 |
| BHA | 1.0 | 10 | [a] 3 |
| 2-tert-Butyl-6-mercapto-p-cresol | 1.0 | 175 | [b] 20 |
| Do | 0.1 | 80 | [b] 12 |
| 2-Dodecyl-6-mercapto-p-cresol | {1.0 | 175 | [b] 25 |
| | {0.1 | 80 | [b] 16 |

[a] Sample discolored shortly after 140° C. test began.
[b] Samples were not discolored during the oven storage test conducted at temperatures as high as 160° C.

(3) *Potency of subject antioxidants in polypropylene.*—As in item 2 regarding polyethylene similar tests were conducted with additives in solid polypropylene of plastic grade as shown by the following table.

| Antioxidant in Polypropylene | Percent | Oven Storage Data—Oven Life, Hrs. at 160° C. |
|---|---|---|
| Control | 0 | 0.2 |
| BHA | 0.1 | 2 |
| 2-tert-Butyl-6-mercapto-p-cresol | 0.1 | 9 |
| 2-tert-Octyl-6-mercapto-p-cresol | 0.1 | 12 |

The table shows that 0.1% additive in polypropylene gives 60 times the stability of the control. Especially advantageous embodiments of this invention relate to processes for extrusion or shaping of polypropylene at 150° C. to 250° C. having from 0.005% to 1% of said stabilizers wherein the alkyl radical in the 2-position contains at least 4 carbon atoms. Thus, an embodiment of this invention provides a process for shaping polypropylene comprising heating a mixture of normally solid polypropylene and 0.005% to 1% by weight of a 2,4-dialkylated-6-mercaptophenol stabilizer wherein each alkyl radical in the 2-position contains from 4 to 20 carbon atoms and each alkyl radical in the 4-position contains from 1 to 4 carbon atoms at 150°–250° C., extruding a shaped object and cooling said object while retaining its shape until it is in a solid condition.

Similar data can be obtained in other poly-α-monoolefins such as poly-1-butene, poly-1-hexene, poly-1-phenylethylene (polystyrene) and other hydrocarbon α-olefin polymers and various types of paraffin waxes.

Other stabilizers of the class covered by this invention which can be effectively employed in such substrates include 2-heptadecyl-4-propyl-6-mercaptophenol, 2-decyl-4-n-butyl-6-mercaptophenol, 2-cyclohexyl-4-isopropyl-6-mercaptophenol and other mentioned above. In addition mixtures of these and other stabilizers can be used including stabilizers for the same or other purposes, e.g. BHA, BHT, 2,2'-thiodi-p-cresol, 2,2'-thiobis(6-tert.butyl-p-cresol), etc.

The following table covering tests employing polyethylene helps to illustrate more effectively the advantage of the invention as to color stability.

| Color Stabilizer | Percent | Color Developed During Oven Storage Test | | | | | | | |
|---|---|---|---|---|---|---|---|---|---|
| | | 140° C. Oven Test | | | | 160° C. Oven Test | | | |
| | | 0 Hr. | 10 Hr. | 80 Hr. | 175 Hr. | 2 Hr. | 5 Hr. | 12 Hr. | 20 Hr. |
| Control | 0 | white | white | amber | | white | yellow | | |
| BHA | 1.0 | do | slight yellow | do | | yellow | do | | |
| BHT | 1.0 | do | white | yellow | | white | | yellow | |
| 2-tert.Butyl-6-mercapto-p-cresol. | 1.0 | do | do | white | white | do | white | white | white. |
| | 0.1 | do | do | do | off white | do | do | do | |
| 2-Dodecyl-6-mercapto-p-cresol. | 1.0 | do | do | do | white | do | do | do | white. |
| | 0.1 | do | do | do | off white | do | do | do | |

In the various tables above BHA represents a mixture of 2-tert.butyl- and 3-tert.butyl-4-hydroxyanisole and BHT represents 2,6-ditert.butyl-1-hydroxytoluene.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. An improved polymer consisting essentially of a solid polyolefin selected from the group consisting of polyethylene and polypropylene containing as an additive from 0.005 to 4 percent by weight of a 2,4-dialkylated-6-mercaptophenol wherein each alkyl radical in the 2-position contains from 1 to 20 carbon atoms and each alkyl radical in the 4-position contains from 1 to 4 carbon atoms, whereby said polymer has improved stability at 140° to 160° C. against oxidation and discoloration.

2. An improved polymer as defined by claim 1 wherein said polyolefin is polyethylene.

3. An improved polymer as defined by claim 2 wherein said additive is 2-tert.butyl-4-methyl-6-mercaptophenol.

4. An improved polymer as defined by claim 2 wherein said additive is 2-dodecyl-4-methyl-6-mercaptophenol.

5. An improved polymer as defined by claim 1 wherein said polyolefin is polypropylene.

6. An improved polymer as defined by claim 5 wherein said additive is 2-tert.-butyl-4-methyl-6-mercaptophenol.

7. An improved polymer as defined by claim 5 wherein said additive is 2-dodecyl-4-methyl-6-mercaptophenol.

References Cited in the file of this patent
UNITED STATES PATENTS

| 2,160,172 | Rosen et al. | May 30, 1939 |
| 2,244,021 | Rosen et al. | June 3, 1941 |
| 2,985,617 | Salyer et al. | May 23, 1961 |